May 31, 1960 R. S. LOMBARD 2,938,754
BEARING SUPPORT STRUCTURE
Filed June 13, 1958
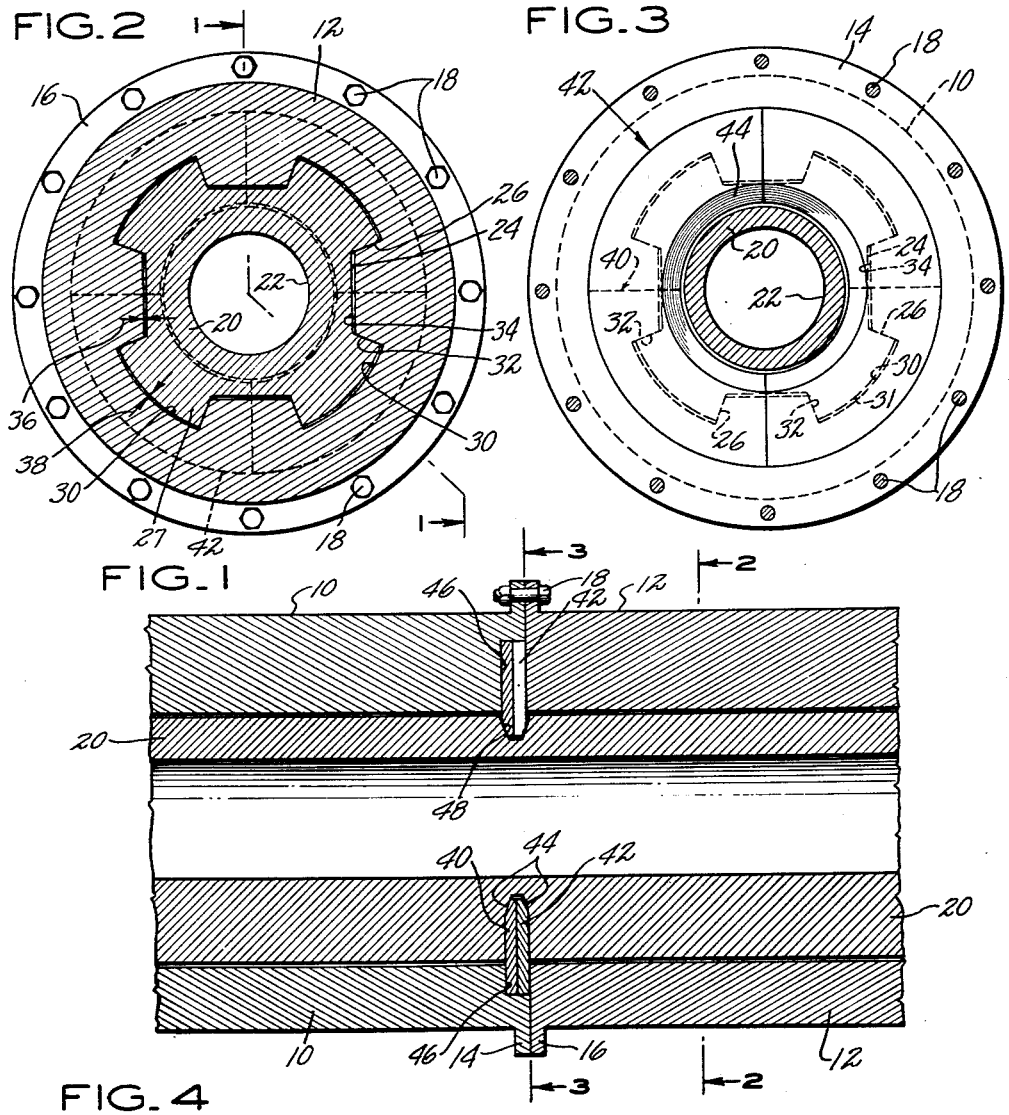
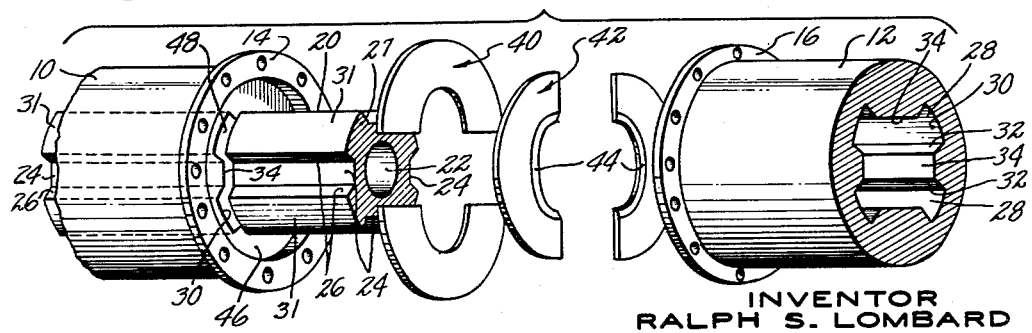
INVENTOR
RALPH S. LOMBARD
BY M. B. Tasker
ATTORNEY

United States Patent Office 2,938,754
Patented May 31, 1960

2,938,754
BEARING SUPPORT STRUCTURE

Ralph S. Lombard, Rockfall, Conn., assignor to United Aircraft Corporation, East Hartford, Conn., a corporation of Delaware Filed June 13, 1958, Ser. No. 741,833

9 Claims. (Cl. 308—22)

This invention relates to bearings and the supporting structure therefor and has particular reference to bearings for liquid metal pumps and the like which operate on corrosive liquids under conditions of widely varying temperature. For example, a liquid metal pump may encounter temperatures ranging from 100° F. to 1500° F.

In a copending application of Brown et al., U.S. application Serial No. 758,737, filed September 3, 1958, a construction is shown for a shaft and journal by which it is possible to maintain concentricity over this wide temperature range between a shaft which has a high coefficient of linear expansion and a journal sleeve on the shaft which has a low coefficient of linear expansion.

When it is attempted, however, to apply the principles of the Brown et al. application to a bearing and its support, some means must be provided for preventing axial leakage through the clearances between the bearing and its support which are provided to allow for the different rates of expansion of the bearing and the bearing support. These clearances may be substantial, especially at the higher end of the temperature range. An effective axial seal becomes imperative if the bearing is to be used in pumps for handling liquid metals or other corrosive metals where a differential pressure exists across the bearing.

It is an object of this invention to provide a bearing and support structure of this type having means for sealing the bearing against the axial escape of fluid.

A further object of the invention is to provide a bearing and support structure, including a seal ring, capable of reacting to axial thrust developed in the bearing.

A still further object of the invention is to improve the construction and operation of high temperature bearings for fluid pumps and the like.

These and other objects and advantages of the invention will be pointed out more specifically in connection with a detailed description of a preferred embodiment of the invention shown in the accompanying drawing. In this drawing, Fig. 1 is a longitudinal sectional view through the bearing and seal structure taken on line 1—1 of Fig. 2;

Fig. 2 is a transverse sectional view taken on line 2—2 of Fig. 1;

Fig. 3 is a transverse sectional view taken on line 3—3 of Fig. 1; and

Fig. 4 is a perspective view showing one half of the bearing and support structure exploded.

The bearing herein shown is adapted to receive a shaft and journal assembly of the type shown in the Brown et al. application above-referred-to, and may include an outer bearing support member and an inner bearing member. The outer bearing support member for reasons which will be later apparent is made in two parts 10 and 12 provided at their proximate ends with external flanges 14 and 16 adapted to be clamped together by a series of peripheral bolts 18. Instead of a bolted flange connection the parts 10 and 12 could be connected by riveting or welding the parts together. The inner bearing member 20 is axially coextensive with the bearing supporting member and has an axial passage 22 therethrough to receive the journal, not shown.

The bearing supporting member, which may be a high tensile strength steel, has a high thermal coefficient of linear expansion, whereas the bearing 20, which is made of some good low tensile strength bearing material, has a very much lower thermal coefficient of linear expansion. Means are provided, similar to those disclosed in the Brown et al. application, for maintaining accurate concentricity of these two metals of widely different coefficients of expansion over a range of 100° F. to 1500° F. To this end the bearing 20, which initially is cylindrical, has a number of axial grooves 24 formed therein at spaced points about its outer periphery. These grooves resemble a usual milled spline construction except that the sides 26 of the grooves are cut on radii of the longitudinal axis of the bearing rather than at right angles to the bottoms of the grooves as is usual in a splined construction. As herein shown, four such grooves are provided in the bearing member 20 providing four splines 27 between the grooves.

Corresponding grooves 28 are cut in the internal periphery of the two parts 10 and 12 of the bearing support member. These grooves are held in axial alignment in parts 10 and 12 by the splines 27. Grooves 28 have arcuate bottom walls 30 which conform to the arcuate uncut portions 31 of the periphery of bearing member 20 and radial side walls 32 which form a snug fit against the radial surfaces 26 of the bearing member. Flat lands 34 between grooves 28 conform to the flat bottoms of groove 24 in the bearing member.

It will be noted that whereas the abutting radial surfaces 26 and 32 on the bearing member and support member are a snug fit, a slight space, or gap, 36 exists between the flat bottoms of grooves 24 and the mating flat surfaces 34 of the support member. Likewise, a space 38 exists between the mating arcuate uncut surfaces 31 of bearing member 20 and the arcuate bottoms 30 of grooves 28 in the support member. These spaces 36 and 38 are for the purpose of permitting differential expansion between the bearing and support members as the temperature changes. At the low end of the temperature range these spaces would be barely perceptible, as shown in Figs. 2 and 3; at the upper end of the temperature range these spaces will increase in dimension. However, whatever the spacing may be at 36 and 38, concentricity of the bearing member and the support member will always be maintained because the abutting radial surfaces 26 on the bearing member, and 32 on the support member, will always be a snug circumferential fit, and these contacting surfaces on the members will slide over each other during temperature changes as necessary to accommodate the expansion and contraction of the bearing and support members.

In order to make the bearing fluid tight at the high temperature values of the temperature range, some means must be provided to seal the spaces 36 and 38. The support member is made in two parts in order to accommodate the sealing means. As shown most clearly in Fig. 4, the sealing means includes two annular washers 40 and 42 which are identical in construction, each having one beveled inner face 44. The washers are preferably made of the same material as the support member and expand with this member. These washers are adapted to be received with their nonbeveled faces back-to-back in an axial recess 46 in the support member part 10 and in an aligned groove 48 formed in the bearing member 20. The groove 48 has its side walls tapered to receive the tapered ends 44 of the assembled washers 40 and 42. In order that the washers 40 and 42 may be assembled in the recess 46 and groove 48 they are diametrically divided, as is clearly shown in Fig. 4. Preferably, the washers are assembled with the dividing diameter of one washer disposed at 90° to the dividing diameter of the other.

It will be evident that as the temperature increases the bearing support member will expand more rapidly than the bearing member. During this expansion the spaces 36 and 38 will increase in dimension and the radial surfaces 32 will slide over the abutting radial surfaces 26 on the bearing member, always maintaining a snug circumferential fit which will maintain concentricity of the bearing member and support member irrespective of the loose radial fit between the two members. During this temperature increase the seal washers 40 and 42 will tighten slightly in the groove 48, because they expand faster than the material of the bearing member, to provide an increased sealing action against axial movement of any fluid tending to leak through the bearing. By varying the angle of taper it is possible to obtain optimum sealing at the particular operating temperature of the bearing.

As a result of this invention a bearing and support structure therefor has been provided which is capable of maintaining concentricity of the bearing and support members over a wide range of temperatures and which is also capable of sealing the bearing against axial flow of fluids under pressure. It will also be evident that a particularly simple and inexpensive sealing device has been provided for such a bearing which, in addition to its sealing function, is capable of reacting axial thrust on the bearing.

While only a single embodiment of the invention has been shown herein, it will be understood that various changes in the construction and arrangement of the parts may be made without departing from the invention. For example, the bearing and its supporting structure may be built for a different temperature range from the specific example given herein for purposes of disclosure.

I claim:

1. In combination, an inner bearing member, a support member surrounding said bearing member, said members having different coefficients of expansion, means for maintaining concentricity of said members over a wide range of temperatures including a plurality of intermeshing axial splines and grooves on the external periphery of said bearing member and on the internal periphery of said support member, said splines and grooves having mutually engaging radial side walls providing a snug circumferential fit between said members over said temperature range and having a gap between confronting surfaces at the bottoms of said grooves, and sealing means extending across said splines and grooves intermediate the axial extremeties of said members.

2. In combination, an inner bearing member, a support member surrounding said bearing member, said members having different coefficients of expansion, means for maintaining concentricity of said members over a wide range of temperatures including a plurality of intermeshing axial splines and grooves on the external periphery of said bearing member and on the internal periphery of said support member, said splines and grooves having mutually engaging radial side walls providing a snug circumferential fit between said members over said temperature range and having a gap between confronting surfaces at the bottoms of said grooves, said support member being divided intermediate its ends to form two parts, said parts having outstanding connecting flanges at their adjacent ends, an annular recess in one of said parts at its flanged end, a communicating annular recess in said bearing member, annular sealing means disposed in said recesses, and means for clamping said flanges together.

3. In combination, an inner bearing member, a support member surrounding said bearing member, said members having different coefficients of expansion, means for maintaining concentricity of said members over a wide range of temperatures including a plurality of intermeshing axial splines and grooves on the external periphery of said bearing member and on the internal periphery of said support member, said splines and grooves having mutually engaging radial side walls providing a snug circumferential fit between said members over said temperature range and having a gap between confronting surfaces at the bottoms of said grooves, said support member being divided intermediate its ends to form two parts, said parts having outstanding connecting flanges at their adjacent ends, an annular recess in said bearing member at said flanged connection, an annular sealing member seated in said recess and closing off the spaces between said confronting surfaces at the bottoms of said grooves, and means for clamping said flanges together to hold said sealing member in sealing position.

4. In combination, an inner bearing member, a support member surrounding said bearing member, said members having different coefficients of expansion, means for maintaining concentricity of said members over a wide range of temperatures including a plurality of intermeshing axial splines and grooves on the external periphery of said bearing member and on the internal periphery of said support member, said splines and grooves having mutually engaging radial side walls providing a snug circumferential fit between said members over said temperature range and having a gap between confronting surfaces at the bottoms of said grooves, said support member being divided transversely intermediate its ends to form two parts, said parts having outstanding flanges at their adjacent ends, an annular recess in one of said parts at its flanged end which is larger in circumference than the grooves in said support member, a communicating annular recess in said bearing member which is more extensive radially than the grooves therein, an annular sealing member seated in said recesses, and means for clamping said flanges together to hold said sealing member in sealing position.

5. In combination, an inner bearing member, a support member surrounding said bearing member, said members having different coefficients of expansion, means for maintaining concentricity of said members over a wide range of temperatures including a plurality of intermeshing axial splines and grooves on the external periphery of said bearing member and on the internal periphery of said support member, said splines and grooves having mutually engaging radial side walls providing a snug circumferential fit between said members over said temperature range and having a gap between confronting surfaces at the bottoms of said grooves, said support member being divided transversely intermediate its ends to form two parts, said parts having outstanding flanges at their adjacent ends, an annular recess in one of said parts at its flanged end which is larger in circumference than the grooves in said support member, a communicating annular recess in said bearing member which is more extensive radially than the grooves therein, an annular sealing member seated in said recesses, said sealing member being diametrically divided to enable it to be inserted into said recess in said bearing member, and means for clamping said flanges together to hold said sealing member in sealing position.

6. In combination, an inner bearing member, a support member surrounding said bearing member, said members having different coefficients of expansion, means for maintaining concentricity of said members over a wide range of temperatures including a plurality of intermeshing axial splines and grooves on the external periphery of said bearing member and on the internal periphery of said support member, said splines and grooves having mutually engaging radial side walls providing a snug circumferential fit between said members over said temperature range and having a gap between confronting surfaces at the bottoms of said grooves, said support member being divided transversely intermediate its ends to form two parts, said parts having outstanding flanges at their adjacent ends, an annular recess in one of said parts at its flanged end which is larger in circumference than the grooves in said support member, a communicating annular recess in said bearing member which is more extensive radially than the grooves therein, an annular sealing member seated in said recesses, said sealing member comprising two washers, each having a beveled outer periphery, said washers being diametrically divided and placed back-to-back with their diametrical dividing lines disposed at 90° to each other and with their beveled faces outwardly disposed to provide a tapered periphery, said groove in said bearing member having a corresponding taper at its inner periphery, and means for clamping said flanges together to hold said sealing washers in sealing position.

7. In combination, an inner generally cylindrical bearing member having an axial passage for a journal therethrough, a cylindrical support member surrounding said bearing member, said members having widely different coefficients of thermal expansion, means for maintaining concentricity of said members over a wide range of temperatures including a plurality of axial splines and grooves on the outer periphery of said bearing member and mating splines and grooves on the inner periphery of said support member, said splines and grooves having radial side walls which provide a snug circumferential fit between said members over said temperature range and having a gap between confronting surfaces at the bottoms of said grooves at least at one end of said temperature range, said bearing member having an external annular sealing groove intermediate its ends which extends beyond the bottoms of the axial grooves and has a tapered bottom therein, said support member being transversely divided into two parts adjacent said groove in said bearing member and having a recess in one part communicating with the recess in said bearing member, sealing means in said recesses in said members closing off the spaces between said confronting surfaces at the bottoms of said grooves, said parts of said supporting member having adjacent outstanding flanges, and means for clamping said flanges together.

8. In combination, an inner generally cylindrical bearing member having an axial passage for a journal therethrough, a cylindrical support member surrounding said bearing member, said members having widely different coefficients of thermal expansion, means for maintaining concentricity of said members over a wide range of temperatures including a plurality of axial splines and grooves on the outer periphery of said bearing member and mating splines and grooves on the inner periphery of said support member, said splines and grooves having radial side walls which provide a snug circumferential fit between said members over said temperature range and having a gap between confronting surfaces at the bottoms of said grooves at least at one end of said temperature range, said bearing member having an external annular sealing groove intermediate its ends which extends beyond the bottoms of the axial grooves and has a tapered bottom therein, said support member being transversely divided into two parts adjacent said groove in said bearing member and having a recess in one part communicating with the recess in said bearing member, sealing means in said recesses in said members having a tapered inner periphery disposed in the tapered bottom of the groove in said bearing member, said sealing means being formed of the same material as said support member, and means for connecting the parts of said support member to retain said sealing means in position in said recesses to close off the spaces between the confronting surfaces at the bottoms of said grooves.

9. In combination, an inner generally cylindrical bearing member having an axial passage for a journal therethrough, a cylindrical support member surrounding said bearing member, said members having widely different coefficients of thermal expansion, means for maintaining concentricity of said members over a wide range of temperatures including a plurality of axial splines and grooves on the outer periphery of said bearing member and mating splines and grooves on the inner periphery of said support member, said splines and grooves having radial side walls which provide a snug circumferential fit between said members over said temperature range and having a gap between confronting surfaces at the bottoms of said grooves at least at one end of said temperature range, said bearing member having an external annular sealing groove intermediate its ends which extends beyond the bottoms of the axial grooves therein and has a tapered bottom, said support member being transversely divided into two parts adjacent said groove in said bearing member and having a recess in one part communicating with the recess in said bearing member, and sealing means in said recesses in said members closing off the spaces between said confronting surfaces at the bottoms of said grooves, said sealing means comprising two washers which are diametrically divided to enable them to be seated in the sealing groove in said bearing member in side-by-side relationship, said washers having their opposite outer circumferential faces beveled to provide a tapered outer periphery which conforms to the taper of the groove in said bearing member, and means for clamping said flanges together with said sealing washers in the communicating recesses in said members.

References Cited in the file of this patent

UNITED STATES PATENTS

| | | |
|---|---|---|
| 1,438,054 | Parsons et al. | Dec. 5, 1922 |
| 2,590,761 | Edgar | Mar. 25, 1952 |